(12) United States Patent
Zabel et al.

(10) Patent No.: US 10,174,846 B2
(45) Date of Patent: Jan. 8, 2019

(54) METAL CUTTING MACHINE AND MACHINING METHOD

(71) Applicant: SMS group GmbH, Duesseldorf (DE)

(72) Inventors: Andreas Zabel, Moenchengladbach (DE); Edmund Plaetzmueller, Moenchengladbach (DE)

(73) Assignee: SMS group GmbH, Duesseldorf (DE)

( * ) Notice: Subject to any disclaimer, the term of this patent is extended or adjusted under 35 U.S.C. 154(b) by 0 days.

(21) Appl. No.: 15/189,192

(22) Filed: Jun. 22, 2016

(65) Prior Publication Data

US 2017/0001278 A1 Jan. 5, 2017

(30) Foreign Application Priority Data

Jul. 1, 2015 (DE) .................. 10 2015 110 603

(51) Int. Cl.

| F16J 15/447 | (2006.01) |
|---|---|
| B23Q 11/10 | (2006.01) |
| B23Q 11/00 | (2006.01) |
| B23Q 11/08 | (2006.01) |
| B23G 1/22 | (2006.01) |

(52) U.S. Cl.
CPC ............. *F16J 15/447* (2013.01); *B23G 1/22* (2013.01); *B23Q 11/005* (2013.01); *B23Q 11/0053* (2013.01); *B23Q 11/0866* (2013.01); *B23Q 11/0891* (2013.01); *B23Q 11/10* (2013.01)

(58) Field of Classification Search
CPC ............. B23Q 11/005; B23Q 11/0053; B23Q 11/0891; B23Q 11/0866; B23G 1/22; B23G 2240/08; B23B 5/168; B23B 47/284; B23B 49/04; Y10T 408/50; Y10T 408/559
See application file for complete search history.

(56) References Cited

U.S. PATENT DOCUMENTS

| 2,359,931 | A | * | 10/1944 | Moffitt | ............... B23B 5/168 29/DIG. 102 |
|---|---|---|---|---|---|
| 2,363,940 | A | * | 11/1944 | Brockway | .............. B23B 49/04 408/112 |
| 3,199,168 | A | * | 8/1965 | Rhine | ................... B23B 5/168 86/19.7 |
| 3,478,843 | A | * | 11/1969 | Eckardt | ............. B23Q 11/1046 184/55.1 |
| 4,919,232 | A | * | 4/1990 | Lofton | ..................... F16N 7/32 184/6.26 |

(Continued)

FOREIGN PATENT DOCUMENTS

| DE | 21 27 344 A | 12/1972 |
|---|---|---|
| DE | 42 41 578 C1 | 3/1994 |

(Continued)

OTHER PUBLICATIONS

German Office Action in DE 10 2015 110 603.5, dated Jun. 2, 2016, with English translation.

(Continued)

*Primary Examiner* — Daniel Howell
(74) *Attorney, Agent, or Firm* — Collard & Roe, P.C.

(57) ABSTRACT

In the machining of a stationary workpiece by means of a rotating tool head, the risk of damages to the workpiece by the chips can be minimized and the removal of the chips can be simplified if a chip collector and a stationary nozzle for fluid are respectively provided.

17 Claims, 3 Drawing Sheets

(56) References Cited

U.S. PATENT DOCUMENTS

| | | | | |
|---|---|---|---|---|
| 5,544,986 A | * | 8/1996 | Kudo | B23B 49/04 408/61 |
| 5,758,996 A | * | 6/1998 | Loudon | B23B 49/02 408/104 |
| 5,951,219 A | * | 9/1999 | Stadtfeld | B23F 17/003 408/67 |
| 5,984,597 A | * | 11/1999 | Chen | B23C 3/35 409/137 |
| 6,071,047 A | | 6/2000 | Nakai | |
| 6,106,203 A | * | 8/2000 | Asmis | B23B 5/166 409/137 |
| 6,629,804 B1 | * | 10/2003 | Rosenbaum | B23B 51/0406 408/112 |
| 2015/0321303 A1 | | 11/2015 | Esser | |

FOREIGN PATENT DOCUMENTS

| | | |
|---|---|---|
| DE | 697 33 160 T2 | 3/2006 |
| JP | S61-089432 U | 6/1986 |
| JP | S61-288956 A | 12/1986 |
| JP | H05-318228 A | 12/1993 |
| JP | H06-15528 A | 1/1994 |
| JP | H07-33513 U | 6/1995 |
| JP | H09-019828 A | 1/1997 |
| JP | H11-333629 A | 12/1999 |
| WO | 2014/020050 A1 | 2/2014 |

OTHER PUBLICATIONS

Belgian Search Report dated Feb. 10, 2017 in Belgian Application No. BE 201600114.
Spanish Search Report dated May 5, 2017 in Spanish Application No. 201630889.
Japanese Office Action dated Apr. 24, 2018 in Japanese Application No. 2016-131519 with English translation of relevant parts.
German Office Action dated Jul. 26, 2018 in DE 10 2015 110 603.5 with English translation of relevant parts.

* cited by examiner

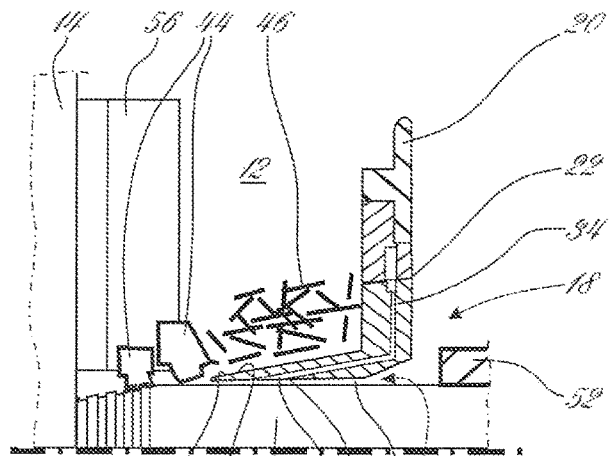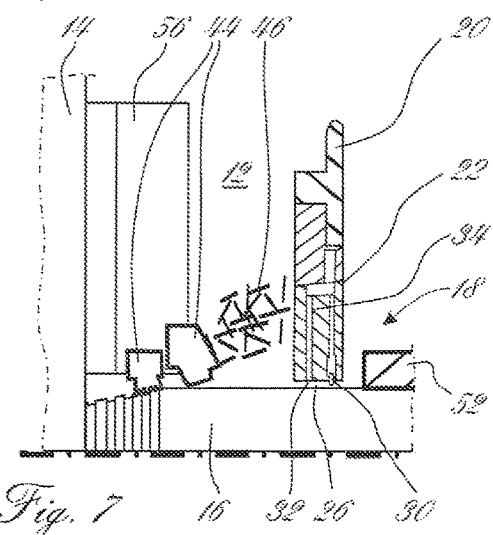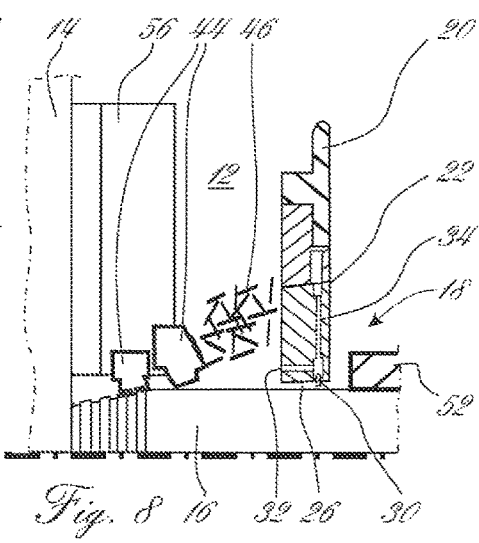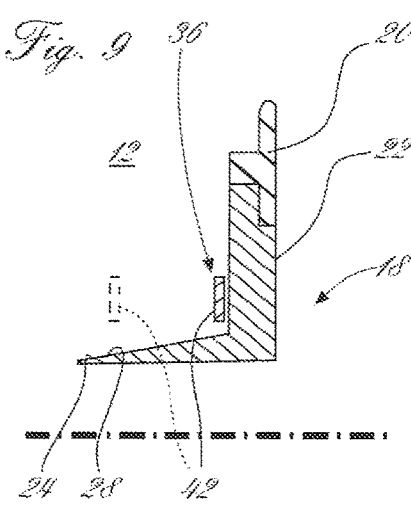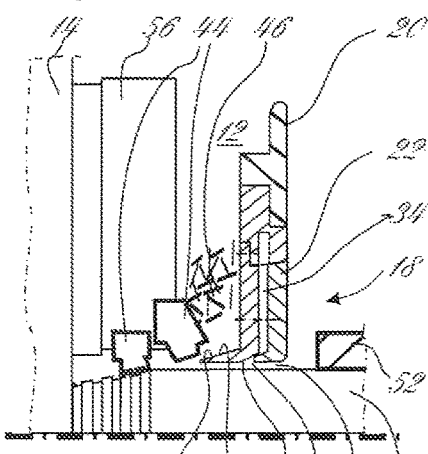

METAL CUTTING MACHINE AND MACHINING METHOD

CROSS REFERENCE TO RELATED APPLICATIONS

Applicant claims priority under 35 U.S.C. § 119 of German Application No. 10 2015 110 603.5 filed on Jul. 1, 2015, the disclosure of which is incorporated by reference.

The invention pertains to a metal cutting machine featuring a tool head that rotates in a machining area, a stationary workpiece, an externally accessible machine hood that encloses the machining area and features a hood opening for introducing the workpiece into the machining area, as well as a screen for preventing fluid from escaping through the hood opening. The invention furthermore pertains to a method for machining a stationary workpiece by means of a metal cutting machine with a rotating tool head.

Corresponding metal cutting machines and machining methods are well known, for example, for providing pipe ends with a thread. In contrast to lathes, the workpiece is in this case fixed by means of one or more clamping jaws or similar holding devices, wherein a slight axial advance toward or away from the rotating tool head may be realized, if applicable, by means of these holding devices. However, a tool head or even a machine housing carrying the tool head is typically displaced in the axial direction referred to the workpieces together with a machine hood that encloses the machining area because this configuration can be constructively implemented much easier, namely also due to the spatial dimensions. In this respect, it is basically irrelevant which of the parts is axially moved because only the relative motion ultimately matters. The tool or the tools are located on the rotating tool head that rotates about a rotational axis, wherein a tool holder is typically also provided on the tool head and can be adjusted relative to the tool head radially referred to the rotational axis, for example by means of actuating drives or NC-axes, such that the corresponding tools can also be adjusted radially referred to the workpiece. In this context, it should be noted that corresponding metal cutting machines frequently rotate with 300 to 1200 revolutions per minute depending on the workpiece or pipe diameter.

The present invention is based on the objective of making available metal cutting machines and machining methods of the initially cited type, in which the risk of damages to the workpiece by the chip or the chips is minimized and/or the removal of the chip or the chips is simplified.

In this context, minimizing the risk of damaging the workpiece by the chip or the chips and simplifying the removal of the chip or the chips basically go hand in hand because damages to the workpiece frequently occur, in particular, during the removal of the chip or the chips. Damages to the workpiece by the chips or the chips also frequently occur if a screen is arranged such that a narrow gap is formed between the screen and the workpiece and the chip or the chips penetrate this gap during the machining process. The present application no longer distinguishes between one chip and multiple chips because it ultimately depends on the concrete marginal conditions of each individual machining process how many individual chips are formed and, in particular, coil around the workpiece while the machining process is carried out in the machining area. In fact, it would be conceivable, in particular, that only a single chip is formed while the workpiece is machined. In practical applications, however, this is extremely rare with presently described metal cutting machines because multiple machining processes such as, for example, chamfering and thread cutting are frequency carried out or multiple tools are distributed on the circumference of the tool head.

The objective of the invention is attained by means of metal cutting machines and machining methods with the characteristics of the independent claims. Other embodiments, which may also be advantageous independently thereof, are disclosed in the dependent claims and the following description.

The risk of damages to the workpiece by the chips can be minimized and the removal of the chips can be simplified if a metal cutting machine featuring a tool head that rotates in a machining area, a stationary workpiece, an externally accessible machine hood that encloses the machining area and features a hood opening for introducing the workpiece into the machining area, as well as a screen for preventing fluid from escaping through the hood opening, is characterized, by a chip collector that is arranged in the machining area behind the hood opening.

The chips can thereby be collected by the chip collector while the stationary workpiece is machined by means of the metal cutting machine with a rotating tool head.

In this way, intimate contact between the chips and the workpiece can be prevented such that the risk of potential damages is reduced to a minimum. In addition, less attention is required: for the removal of the chip or the chips because slight damages to the chip collector can ultimately be tolerated.

In a suitable design, the removal of the chips takes place without requiring manual interventions.

It would likewise be conceivable, for example, that the chip collector consists of hardened materials or is provided with hardened materials in order to counteract wear.

The screen typically serves, among other things, for preventing or largely preventing access to the machining area through the hood opening, for example with a tool or with the hands of an inattentive operator who operates the metal cutting machine, during the machining process of the workpiece. Among other things, the screen typically also serves for minimizing the risk of fluid, flying chips or the like escaping from the machining area.

In a suitable design, the chip collector can also prevent the chips from penetrating into a gap between the screen and the workpiece in that the chip is collected by the chip collector. If the chip collector has a suitable design, the chip can, if applicable, even be diverted from the gap in this case. This ultimately makes it possible to move the screen very close to the workpiece because the risk of the chip penetrating the gap is reduced. In addition, this ultimately also reduces the loss of fluid, which basically should only be located within the machining area and retained by the machine hood. However, if the screen is spaced apart from the workpiece relatively far in accordance with the prior art due to the risk of chips penetrating the gap between the screen and the workpiece, the escape of fluid—and therefore a corresponding loss of fluid—is unavoidable.

In this respect, it is advantageous it the gap between the screen and the workpiece amounts to less than 20 mm, preferably less than 15 mm. If applicable, the gap may be realized even smaller. However, the gap can also be realized larger and still adequately prevent the escape of fluid from the machining area and the admission of foreign matter into the machining area if other suitable measures are provided, for ex amp lie a particularly precise chip collector, as well as an axially very deep wall of the screen extending around the workpiece. However, a gap below 20 or 15 mm is particularly advantageous with respect to a compromise referred to supplementary measures that may be deemed necessary, if applicable. It goes without saying that a screen may, if applicable, also be provided or used for different workpiece diameters such that the gap widths would vary accordingly in this case.

It would furthermore be conceivable, although in a purely theoretical sense, to arrange the screen farther from the tool head, but this would lead to substantial exterior dimensions of the machine hood that in turn would not only result in a loss of space, but also in significant handling problems, for example, because clamping jaws or other holding devices could not be arranged sufficiently close to the tool head and the unclamping length is increased such that other problems, e.g. vibrations and the like, may ultimately arise. Consequently, significant advantages with respect to the axial extent of the machining area up to the holding devices or the clamping jaws can be attained with the above-described chip collector, which allows a small gap between the screen and the workpiece without a considerable risk of the chip penetrating this gap, namely in that the screen can be moved very close to the tool head because the risk of the chips penetrating the gap is reduced. Accordingly, it is advantageous if the screen or the hood opening respectively is axially spaced apart—i.e. along the rotational axis—from the rotating tool head or from the tool holder by no more than 20 cm, preferably no more than 15 cm or no more than 12 cm.

It goes without saying that the chips collected by the chip collector are preferably removed from the chip collector prior to a workpiece exchange such that the chip collector once again has sufficient intake capacity when the next workpiece is machined. In this respect, it goes without saying that the removal of the chips could, if applicable, also be carried out less frequently if the chip collector has a sufficient capacity. In a suitable design, this chip removal particularly may take place without manual intervention.

In this context, it is particularly advantageous if the chip collector is initially removed from the workpiece together with the tool such that the risk of potential damages to the workpiece during the subsequent removal of the chips can be additionally reduced. In a suitable design and process management, the chips car be retained between the tool or the tool head on the one hand and the chip collector on the other hand such that they remain suitably positioned during this step and cannot reach the workpiece.

A suitable design particularly makes it possible to ensure that no coiled chips remain on the workpiece when it exits the machining area, wherein malfunctions—naturally—cannot be taken into consideration in this respect.

The fluids used during the machining process typically consist or cutting fluids such, as emulsions of cutting oil and water. It goes without saying that it is also possible, if applicable, to use other fluids such as, in particular, water or pure cooling liquid or even pure cutting oil. If applicable, the fluids used may likewise consist of pure cooling liquids or cooling fluids. The fluids may also be present m the machining area for entirely different purposes and fly around therein in a nearly ubiquitous fashion. In this respect, it goes without saying that the fluids used may not only consists of liquids such as water, alcohol, oil or even liquid gases, but also of gases as such, particularly of air or protective gas, or of mists or other combinations of gases and liquids.

In the present context, it should be emphasized that the externally accessible hood opening allows the introduction or insertion of the tool into the machining area and is ultimately located in the outer surface of the machine hood. Potential structures that point axially inward into the machining area or at the tool head do not form part of the hood opening, out rather have a separate functionality. The hood opening is in accordance with its definition located in the outer envelope of the machine hood whereas the walls that point inward into the machining area or at the tool head from the hood opening can be referred to as workpiece channel walls, wherein these workpiece channel walls then point at the tool head starting from the hood opening.

Accordingly, the term "behind the hood opening," which particularly designates the position of the splash protection relative to the hood opening, defines a position located on the side of the hood opening that points away from the external surroundings of the machine hood. If applicable, the chip collector particularly may be arranged directly behind the hood opening and—if applicable—even extend the machine hood and the screen inward in the direction of the machining area and the tool head through the hood opening. It goes without saying that the exact arrangement of she chip collector relative to rise hood opening is discretionary as long as it is located behind the hood opening and as long as it can fulfill its chip collecting function. In this respect, it would particularly be possible to realise an arrangement within the machining area, directly on or integrated into the screen or radially outward of an enveloping surface that extends axially referred to the tool head starting from the hood opening.

The chip collector preferably comprises a collecting surface that is conically tapered toward, the workpiece head such that the chips formed during the machining process can be easily collected along the conical collecting surface. It goes without saying that different designs of the chip collector may also be provided in different embodiments and in dependence on the chips to be expected. If applicable, it may suffice, for example, to merely provide rods that are arranged axially parallel to the rotational axis or a mesh arrangement in order to adequately collect the chips being formed and to respectively keep these chips away from the workpiece and the gap. Collecting surfaces with a different design may likewise be provided, particularly if the chips being collected along the collecting surfaces should be guided in a special way. For example, a purposeful removal could already be achieved by means of funnel-shaped collecting surfaces.

Conically shaped collecting surfaces or, for example, rods that, are correspondingly arranged in a basically conical shape have the advantage that chips not only can be easily collected in such a cone, but that the corresponding chips located on the cone can also be easily removed toward the cone point. If the workpiece end is chamfered during the machining process, i.e. provided with a conical shape, the conical shape of the collecting surface preferably corresponds to the conical shape chamfered on the workpiece such that the corresponding tool can move over the collecting surface without causing damages thereto and possible subsequent tools can be moved as close as possible to the collecting surface. The latter results in the option of allowing a very short unclamping length.

The collecting surface preferably is arranged rotationally symmetrical to the rotational axis. If the chip collector has a more complex design, it is likewise advantageous if it is arranged symmetrical referred to this rotational axis, for example mirror-symmetrical or axially symmetrical. This takes into account the fact that the tool head rotates about the rotational axis and a chip or chips therefore can ultimately form at any angle of rotation about this rotational axis with certain statistic probability.

It would ultimately also be conceivable that the chip collector is arranged on and rotates together with the tool head. However, this would require considerable structural modifications of the tool head that ultimately would also significantly impair the normal machining sequences. This is the reason why it is advantageous to arrange the chip collector stationarily, i.e. such that it does not rotate together with the tool. This naturally means that it may foe displaceable in a certain way, for example, in order to simplify or allow the removal of the collected chips. It is particularly advantageous if the chip collector is arranged on the screen and/or on the machine hood because it is then also directly connected to the subassemblies, with which it should cooperate. In a suitable design, among other things, it should prevent—as already mentioned above—the penetration of the chip into the gap between the screen and the workpiece and also the penetration of the chips into the gap between the workpiece and the machine hood located, e.g., in the region of the hood opening.

The screen and the machine hood are typically arranged such that they can be displaced relative to the tool head for maintenance purposes anyway such that this displaceability can then also be used for realizing a displaceability of the chip collector when a removal of the chips should be carried out and this chip removal can be simplified with a corresponding displacement.

It goes without saying that the chip collector may be realized in one piece with the entire screen or the machine hood, but this would significantly complicate maintenance work and also an adaptation to different workpiece diameters. In this respect, it is advantageous if the chip collector is mounted on the machine hood such that it can be exchanged, if applicable, together with subassemblies of the screen only, for example an inner ring of the screen. For example, the screen may be composed, in particular, of multiple parts such that one part of the screen may, if applicable, also be realized in one piece with the chip collector.

The chip collector is preferably realized exchangeable in the form of an expendable part.

If applicable, the chip collector particularly may—as already mentioned above—be arranged directly behind the hood opening and—if applicable—even extend the screen inward in the direction of the machining area and the tool head through the hood opening. The exact arrangement of the chip collector relative to the hood opening is discretionary as long as it is located behind the hood opening and as long as it can fulfill its chip collecting function.

In this respect, it would particularly be possible to realize an arrangement within the machining area, directly on or integrated into the screen or radially outward of an enveloping surface that extends axially referred to the tool head starting from the hood opening.

The screen may comprise a mechanical seal in order to minimize the risk of an escape of fluid as effectively as possible. The above-described chip collector can protect the mechanical seal, which is typically much more sensitive than, for example, the material of the machine hood, from being damaged by the chip. Previous attempts to utilize mechanical seals, particularly the preferred elastic seals, failed because the still very aggressive chip already destroyed the mechanical seal within a very short period of time. The preferred elastic seals make it possible to quickly seal the gap between the screen and the tool and to correspondingly seal the hood opening, wherein elastic seals can be very easily opened and closed, for example, when the workpiece or the screen or the machine hood respectively needs to be moved. On the other hand, it goes without saying that it is possible to eliminate a mechanical seal under certain circumstances it other sealing options are used, for example a contactless seal, a labyrinth seal, a Bernoulli seal or a Venturi seal.

The risk of damages to the workpiece by the chip can be minimized and the removal of the chips can be simplified if a method for machining a stationary workpiece by means of a metal cutting machine with a rotating tool head is characterized in that the stationary workpiece is acted upon with fluid by means of at least one stationary nozzle during the machining process.

The risk of damages to the workpiece by the chip or the chips accordingly can be minimized and the removal of the chip or the chips can be simplified if a metal cutting machine featuring a tool head that rotates in a machining area, a stationary workpiece, an externally accessible machine hood that encloses the machining area and features a hood opening for introducing the workpiece into the machining area, as well as a screen for preventing fluid from escaping through the hood opening, is characterized by a stationary nozzle for fluid that is directed at the workpiece.

In contrast to the prior art, in which fluid is supplied through nozzles arranged on the rotating tool head, fluid is now cumulatively and alternatively supplied through a stationary nozzle or through stationary nozzles that consequently do not follow the motion sequence of the tool head. This ensures that the workpiece is basically acted upon with fluid in such a way that the fluid ultimately can advantageously act upon the entire workpiece and—if the nozzle is suitably directed—permanently protect the stationary subassemblies such as the gap between the workpiece and the screen or a mechanical seal or the like, wherein the risk of damages to the workpiece or the seal by the chip can thereby be minimized and, in a suitable design, superior chips, i.e. chips that are less aggressive or do not rest against the workpiece as firmly, can thereby be formed. The removal of the chips is also simplified because fluid with its lubricating and cooling properties is ultimately present on the workpiece stationarily and therefore at correspondingly stressed locations.

If the screen features the above-described mechanical seal, in particular, it is possible to tolerate an excess amount of fluid, which particularly also acts upon the workpiece in a region in front of the seal referred to a view of the machining area, because an escape of fluid can also be effectively prevented by means of the mechanical seal at higher fluid pressures.

It proved particularly advantageous to spray the fluid on the chip or on the chips during the machining process. In this case, it is assumed chat the characteristics of the chips can thereby be altered to the effect that they are coiled or realised less aggressively and less cramped and/or the coiling effect is reduced. The fluid pressure directed at the chip or the chips alone could likewise lead to the chip or the chips being removed farther from the workpiece or being formed in the direction of the tool head and therefore not resting against the workpiece excessively tight such that the risk of damages to the workpiece by the chips is accordingly minimized and the removal of the chips is simplified. In a suitable design of the nozzle and the fluid acting upon the chips, particularly with a sufficiently high axial component, higher radially directed forces, which, correspondingly form the chips in a suitable fashion, can—presumably—be generated in connection with the machining and holding forces acting upon the respective chip than in instances, in which fluids are used with a significant radial component starting from the tool head or from the tool holder in accordance with the prior art.

In light of the fact that the chips are ultimately formed in a revolving fashion by the rotating tool head, it is advantageous if the fluid is supplied in the form of a closed fluid sheath that surrounds the rotational axis of the tool head or has a corresponding rotational symmetry suet that fluid can be supplied in a sufficient amount through the stationary nozzle. This fluid sheath particularly may propagate on the surface of the workpiece in the direction of the tool head and thereby be purposefully guided in the direction of the chips or in the direction of the tool and/or in the direction of the location being machined, wherein the moving direction in a suitable design likewise acts in a sealing fashion and leads particles away from, the gap between the hood opening and the workpiece. It goes without saying that a corresponding rotationally symmetrical, nozzle shape can preferably also be provided.

In this respect, the stationary nozzle used may consist, in particular, of a ring nozzle. Alternatively, the stationary nozzle may comprise multiple nozzle outlets such that fluid is accordingly sprayed at the stationary workpiece and at the chips angularly. It would particularly be conceivable that the stationary nozzle generates a closed fluid sheath that extends around the workpiece.

However, this initially requires a significant excess amount of fluid because it is also sprayed at locations that are ultimately not subject to machining at the respective time. All in all, it was determined, however, that this has advantageous effects on the tool wear and on the chip formation or the chips, which rest against the workpiece less aggressively and are less cramped, wherein the chips particularly also have a reduced tendency of penetrating the gap between the screen and the workpiece and their coiling effect is reduced. Since the fluid can ultimately be circulated and losses can be minimized by means of the screen, which in the present embodiment can be realized much more effective than m the prior art, this disadvantage can be readily accepted because only a higher pump capacity is ultimately required. The degree of contamination of the fluid particularly is basically identical such that potential filters can also have a simpler design due to the correspondingly higher throughput of fluid.

The fluid is preferably supplied to the location being machined in the form of a closed fluid, sheath that propagates on the surface of the workpiece. This leads to the fluid acting upon the workpiece in a very uniform fashion, which—according to test results—in turn leads to the improved chip properties described above.

As already indicated above, no distinction between a stationary nozzle on the one hand and stationary nozzles on the other hand is made in the present context because a stationary nozzle may ultimately also feature several nozzle outlets—and corresponding fluid channels leading to these nozzle outlets—such that all stationary openings, which lead into the machining area and through which fluid can be made available, are defined as parts of the stationary nozzle outlets of the stationary nozzles unlike potential fluid nozzles arranged on the rotating tool.

In this context, it should be emphasized that the term "stationary" merely refers to the rotation relative to the rotating tool head such that the nozzle may by all means carry out its own motion, for example, on a pivot arm or together with structures carrying the nozzle such as, for example, the machine hood or the screen.

The nozzle or individual components of the nozzle and associated nozzle channels may be provided, in particular, on or in the screen or in subassemblies thereof. The screen particularly may be composed of multiple parts such that the nozzle can be arranged in one of the screen parts. It would also be conceivable that the screen only features parts of the nozzle such as, for example, only a section of the wall of a nozzle, a partial nozzle and/or a nozzle channel. This design allows a quick adaptation to potentially changing workpiece diameters or simple maintenance procedures.

In a preferred embodiment, the nozzle opens into the gap between the screen and the workpiece such that fluid is directly sprayed into this gap. This already results in very effective protection against the potential penetration of chips into this gap, wherein a corresponding seal toward the hood opening should naturally be provided in this case in order to effectively prevent the fluid from escaping in undesirable amounts. This may be realized, for example, with the above-described mechanical seal. Other sealing mechanisms such as, for example, a Bernoulli seal may naturally also be used.

For example, the nozzle may be directed at the tool head such that fluid is driven into the gap in the direction of the tool head and flows into the processing area due to its flow speed rather than escaping through the hood opening. Directing the nozzle at the tool head naturally may also be advantageous for other reasons, for example in order to act upon the chips at this location.

In a suitable process management, a nozzle that is directed at the tool head and opens into the gap between the screen and the workpiece makes it possible to generate a Bernoulli effect, by means of which a vacuum toward the hood opening is generated in the gap between the screen and the workpiece in the region in front of the nozzle in order to additionally improve the sealing effect.

It is accordingly advantageous if a gap is formed between the workpiece and the screen and the gap is sealed by means of a Bernoulli seal. In this way, a potential loss of fluid, can be minimized in a particularly simple and effective fashion whereas the fluid used for generating the Bernoulli effect, drives the chips away from the workpiece and from the gap such that the risk of damages to the workpiece by the chips is minimized and the removal of the chips is simplified. In this case, it is assumed that the flow itself already results in a vacuum that can have a corresponding sealing effect.

As already mentioned above, a significant excess amount of fluid is required, in particular, when a Bernoulli nozzle is used, but also when an otherwise closed fluid sheath propagating on the surface of the workpiece is used. Depending on the concrete process management, it would be conceivable that this excess amount of fluid as such already has a positive effect on the formation of the chips, particularly with respect to their curvature, with respect to the coiling effect and with respect to their cramping, for example due to excellent cooling. If applicable, a very effective protective film can furthermore be realised on the workpiece with this excess amount of fluid. The same applies to the chips if the fluid is sprayed at the chips. In a suitable design and process management, it is conceivable that the coiled chips can be reliably removed from the workpiece mechanically or no longer form on the workpiece itself such that damages to the workpiece are prevented.

If applicable, the Bernoulli nozzle utilizing the Bernoulli effect may also be realized in the form of a venturi nozzle and therefore even entrain ambient air in considerable amounts.

Since the supply of fluid is directed at the workpiece, it is possible to eliminate, if applicable, a fluid supply that rotates together with the tool head such that the machine construction effort can be significantly reduced and less structural space is required in the region of the spindle and in the region of the tool head, wherein more structural space particularly remains in the region of the tool head, as well as in the region of the tool holder that rotates together with the tool head, and can potentially be used for the purposes. The aforementioned elimination particularly means that complex rotary leadthroughs and seals, by means of which the fluid has to be made available in a sufficient amount and with sufficient pressure at the rotating tool head, are no longer required. This results in other significant constructive advantages because even precise and very long bores, which typically have to be produced with elaborate production processes, are no longer required. Furthermore, additional passages for liquids between the tool holder, which is movably arranged on the tool head, and the tool head are no longer necessary.

The chip collector preferably comprises a stripper that—when sufficient chip is located on the chip collector—removes this chip from the chip collector. For example, such a stripper may be designed mechanically in that corresponding tongs or a gripper or simply a bow or a ring respectively strips over the chip collector or over the collecting surface and removes the chips from the chip collector due to this motion.

Other devices such as nozzle outlets, particularly of the stationary nozzle, may also be used as strippers. These nozzle outlets are preferably realized in the form of stripping nozzles and connected to a separate stripping fluid channel such that they can be respectively actuated separately of the remainder of the stationary nozzle or separately of the remaining nozzle outlets of the stationary nozzle when a stripping process should be carried out. In this respect, it goes without saying that—depending on the concrete requirements—the stripping nozzle or the stripping nozzles can also be used for acting upon the workpiece and the chips with fluid during the machining process. These solutions are particularly preferred due to the elimination of moving parts, wherein it goes without saying that compressed air particularly can be used in this case, for example, if the stripping nozzles are separately supplied with fluid.

The chip collected by the chip collector can be mechanically stripped off the chip collector by means of the stripper prior to a workpiece exchange such that the previous manual effort for removing the chips from the workpiece, which ultimately represented a significant obstacle for even higher cycle times, in particular, at a high number of machining cycles, is no longer required. It goes without saying that corresponding advantages can also be attained with such a removal device, which removes the chip collected by the chip collector from the chip collector prior to a workpiece exchange, independently of the remaining characteristics of the present invention.

In order to make available sufficient space for removing the chip collected by the chip collector, it is advantageous if the chip collector is axially displaced away from the tool head prior to carrying out the removal. This can also be mechanically realized with corresponding drives or actuators that are provided anyway, for example for moving the machine hood, such that the removal of the chips can be carried out without manual intervention.

Depending on the concrete process management, the chip collector may be axially displaced together with the workpiece because the workpiece also has to be removed after it has been machined by the metal cutting machine in order to supply the next workpiece. On the other hand, it goes without saying that the chip collector can also be displaced subsequent to the workpiece and—under special circumstances—even prior to the workpiece. It is particularly preferred that the chip collector and the tool head are jointly displaced axially relative to the workpiece such that the latter exits the machining area. The removal of the chips can then be carried out in the above-described fashion such that the risk of the chips returning onto the workpiece can be minimized. Once the chips are removed, the next workpiece can be supplied and positioned, for example, by the clamping jaws. If applicable, the chip collector simultaneously or previously approaches the tool head once again for this purpose.

For the sake of completeness, it should be noted that the term "stationary" presently only refers to the workpiece not rotating during the machining process in contrast to the tool head. However, other motions that take place significantly slower than the rotation of the rotating tool head, particularly during the supply and the removal of the workpiece, as well as during the machining process, are not ruled out. The rotating tool head preferably also continues to rotate during a workpiece exchange, if applicable with different rotational speeds.

It goes without saying that the characteristics of the solutions described above and in the claims can, if applicable, also be combined with one another in order to accordingly implement the advantages cumulatively.

Other advantages, objectives and characteristics of the present invention are elucidated in the following description of exemplary embodiments that are illustrated in the attached drawings. In these drawings:

FIG. 6 shows a second metal cutting machine in the form of an illustration similar to FIG. 2;

FIG. 7 shows a third metal cutting machine in the form of an illustration similar to FIGS. 2 and 6;

FIG. 3 shows a fourth metal cutting machine in the form of an illustration similar to FIGS. 2, 6 and 7;

FIG. 9 shows a fifth metal cutting machine in the form of an illustration similar to FIGS. 2 and 6-3, however, without tool, head and workpiece; and FIG. 10 shows a sixth metal cutting machine in the form of an illustration similar to FIGS. 2 and 6-8.

Figure 1:
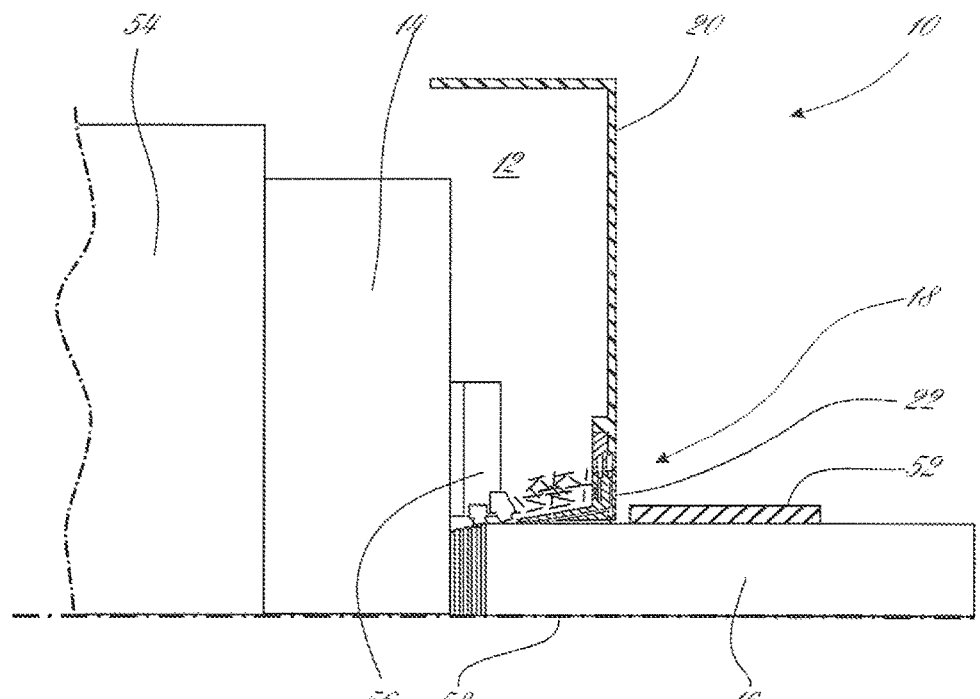
FIG. 1 shows a schematic section through the rotational axis of a tool head of a metal cutting machine.

The metal cutting machine 10 illustrated in FIGS. 1-5 comprises a machine housing 54 with a drive for a tool head 14 that revolves about a rotational axis 58. The tool bead 14 carries a tool holder 56 that can be radially (x-axis) adjusted relative to the rotational axis 58 and on which tools 44 are provided.

The metal cutting machine 10 furthermore comprises clamping jaws 52, by means of which a workpiece 16 can be stationarily held relative to the tool head 14, wherein the tool head 14 can be axially (z-axis) displaced relative to the clamping jaws 52, i.e. parallel to the rotational axis 58, in order to axially adjust, the tools 44 relative to the workpiece 16. A not-shown lateral transport is also provided in order to realize the supply and removal of the workpiece 16. If applicable, other units may be provided for the supply and removal in alternative embodiments. It would likewise be conceivable that an axial, adjustment of the tools 44 relative to the workpiece 16 required for the machining process is realised due to an axial motion of the machine housing 54, the tool head 14 and/or the tool holder 56.

The metal cutting machine 10 furthermore features a machine hood 20 with a hood opening 18, wherein the workpiece 16 can protrude into a machining area 12 as far as the tool head 14 through the hood opening 18 in order to be machined, and wherein the machine hood 20 can be axially displaced, i.e. parallel to the rotational axis 58, in order to provide access for maintenance work or for the removal of potential chips 46 or to provide space for processing potential chips 46. It goes without saying that the machine hood 20 may in different embodiments uncover the machining area 12 in a different way, for example in that it is divided and its parts can be respectively pivoted away.

In order to prevent the escape of fluid or other particles from the machining area 12, a screen 22 is provided on the hood opening 18, wherein the screen is composed of two parts in this exemplary embodiment, but this two-part design is merely related to the manufacture of the screen such that additional subassemblies or even a one-piece designs would also be conceivable in different embodiments.

Figure 2:
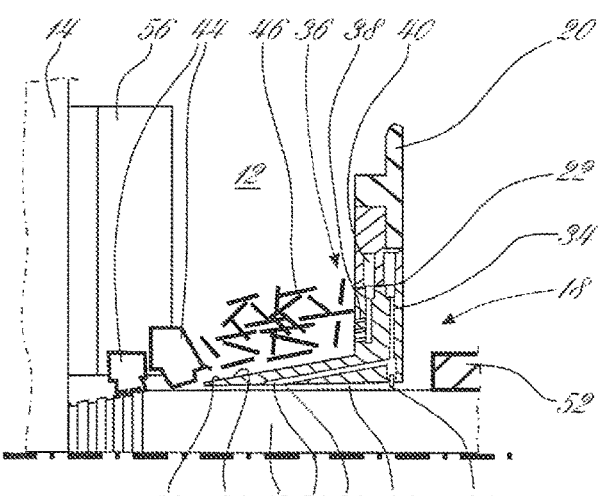
FIG. 2 shows an enlarged detail of the arrangement according to FIG. 1.

FIG. 2, in particular, shows that a relatively narrow gap 26 is formed between the screen 22 and the workpiece 16, wherein this gap is on the side of the hood opening sealed with a seal 30 that is realized in the form of an elastic ring seal in this exemplary embodiment.

A chip collector 24 is arranged on the screen 22 and in this exemplary embodiment comprises a conical collecting surface 28 that is tapered in the direction of the rotating tool head 14 and arranged rotationally symmetrical referred to the rotational axis 58 of the tool head 14.

A nozzle 32 is furthermore arranged in the screen 22, wherein said nozzle is in this exemplary embodiment realized in the form of a ring nozzle and can be supplied with fluid by means of a fluid channel 34.

In this exemplary embodiment, the fluid pressure in the fluid channel 34 also acts upon the seal 30 in order to close this seal, wherein the seal 30, which is realized in the form of an elastic ring in this exemplary embodiment, basically springs back in the unpressurized state and releases the workpiece 16, but closes tightly under pressure.

It goes without saying that the nozzle 32 may also be provided separately or in other subassemblies in different embodiments.

In this exemplary embodiment, the nozzle 32 is directed at the workpiece, namely angled at the tool head 14, such that fluid can be supplied to she location being machined in the direction of the rotating tool head 14 in the form of a closed fluid sheath that propagates on the surface of the workpiece. At a sufficient fluid pressure, a vacuum is generated toward the seal 30 in the gap 26 and additionally improves the sealing effect.

The chip collector 24, as well as the fluid delivered through the nozzle 32, act upon the chips 46 and keep these chips away from the workpiece 16 and, in particular, from the gap 26. The chips 46 accumulate on the chip collector 24.

The nozzle 32 in the form of a stationary nozzle 32 also comprises stripping nozzles 38 that can be supplied with a fluid by means of a separate stripping fluid channel 40. A supply with another liquid would also be conceivable in different embodiments.

The stripping nozzles 33 are also directed at the workpiece 16 and at the rotating tool head 14, as well as at the chips 46 accumulating on the chip collector 24. In this respect, it would be conceivable that the fluid from the stripping nozzles 38 is also used for influencing the chips 46, particularly for cooling or lubricating the collecting surface 28 of the screen 22.

Figure 3:
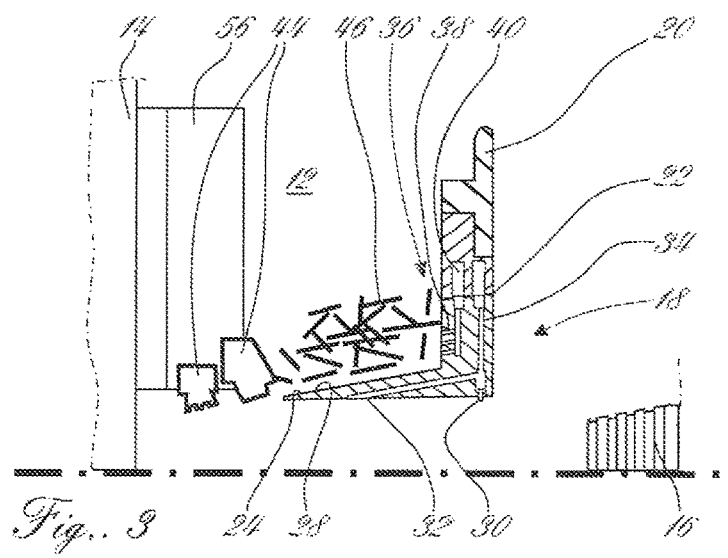
FIG. 3 shows the arrangement according to FIG. 2 with an axial displacement of the machine hood and the tool head.

However, the stripping nozzles 38 are preferably used as strippers 36 in that the machine hood, as well as the machine housing 54 with the tool head 14, is displaced axially parallel to the rotational axis 58 of the cool head 14 as illustrated in FIG. 3 after the machining process is completed such that the workpiece exits the machining area 12 and the machine hood 20 through the hood opening 18.

Figure 4:
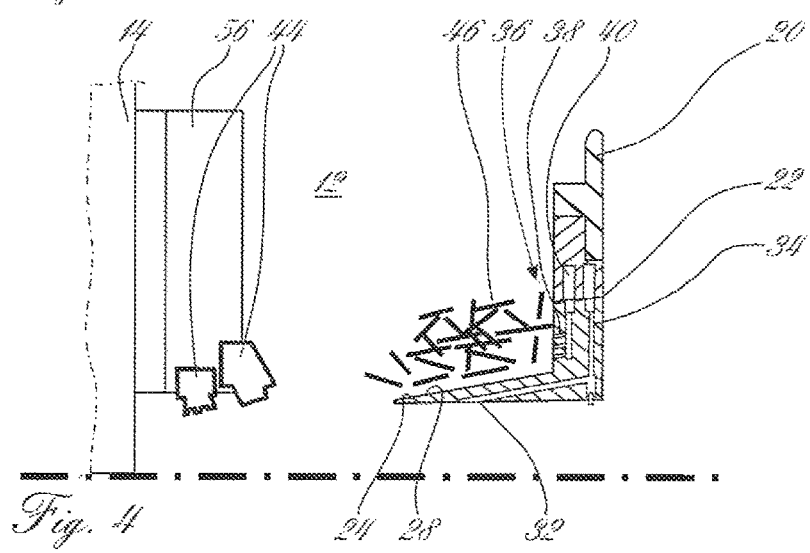
FIG. 4 shows the arrangement according to FIGS. 2 and 3 with removed workpiece and axially displaced screen.
Figure 5:
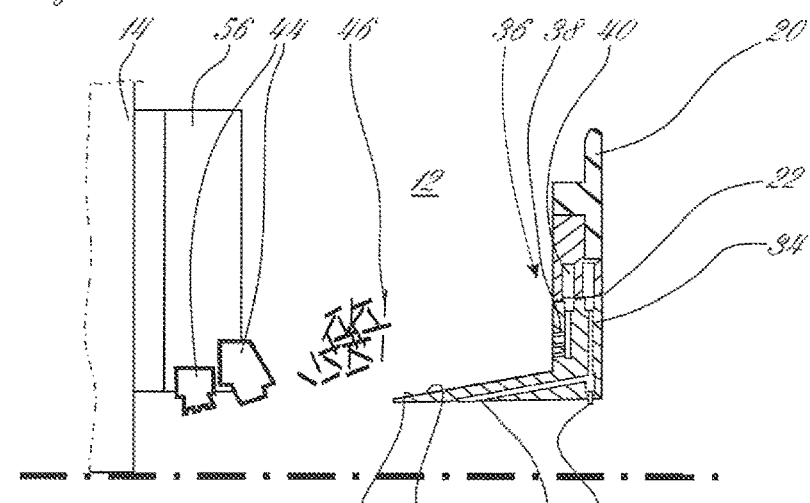
FIG. 5 shows the arrangement according to FIGS. 2-4 during the removal of the chips from the chip collector.

Subsequently, the machine hood 20 is axially displaced relative to the tool head as illustrated in FIG. 4 such that the machining area 12 is sufficiently accessible and, in particular, sufficient space for removing the chips 46 is provided, wherein the stripping nozzles 38 subsequently eject fluid, the pressure of which suffices for stripping the chips 46 off the chip collector 24 as illustrated in FIG. 5.

The machine hood 20 can subsequently be moved toward the tool head 14 again and the next workpiece 16 can be supplied.

A sufficient vacuum toward the outlet opening 18 can be generated, if applicable, by means of the nozzle 32 due to its entrance angle into the gap 26 between the screen 22 and the workpiece 16 such that the seal 30 can be eliminated and the Bernoulli effect of the nozzle 32 configured in the form of a Bernoulli nozzle 50 can be used as a Bernoulli seal 48 as schematically illustrated in FIG. 6. This represents a particularly simple constructive solution to the sealing problems and also reduces potential wear.

The stripping nozzles 38 are furthermore eliminated in the exemplary embodiment illustrated in FIG. 6, wherein the stripping process is in this exemplary embodiment realized by means of a not-shown manipulator in the form of a robot arm that removes the chips 46 after workpiece 16 has been retracted. The stripper 36 used may likewise consist, for example, of a mechanical stripper 42 of the type illustrated in FIG. 9 and described in greater detail below.

In the exemplary embodiments illustrated in FIGS. 7 and 8, a chip collector was eliminated such that the screen 22 and the machine hood 20 can be moved very close to the tool 14. These embodiments have a particularly space-saving axial construction and therefore make it possible to realize a relatively short unclamping length of the workpiece 16. However, the exemplary embodiment according to FIG. 7 and the exemplary embodiment according to FIG. 8 respectively feature a nozzle 32 that is arranged m the screen 22 and acts upon the stationary workpiece 16 and the tools 14 with fluid.

The nozzle 32 in the exemplary embodiment according to FIG. 7 is directed into the gap 26 between the workpiece 16 and the screen. 22, wherein, the seal 30 ensures that the fluid remains in the machining area 12 and propagates on the surface of the workpiece 16 in the direction of the tool head 14 in the form of a closed fluid sheath, and wherein the fluid is merely used for preventing the chips 46 from, coiling excessively tight on the workpiece 16 and does not have to reach as far as the location being machined because a conventional (not-shown) fluid supply is provided at this location on the tool head 14 by accepting a fluid supply by means of movable subassemblies.

In the exemplary embodiment illustrated in FIG. 8, the nozzle is directed at the tool head 14, wherein the nozzle scatters the fluid so far that the workpiece 16 is also acted upon with fluid. In this case, the fluid sheath extends as far as the location being machined and thereby effectively prevents damages to the workpiece 16 by the chips and, in particular, the penetration, thereof into the gap 26, however, with a correspondingly reduced efficiency with respect to flushing the gap 26.

The mechanical stripper 42 illustrated in FIG. 9 merely consists of a ring that surrounds the collecting surface 28 of the chip collector 24 and can be displaced relative to the chip collector 24 in the axial direction.

In other respects, a stationary nozzle was eliminated in this exemplary embodiment because the chips expected in accordance with the present exemplary embodiment can be sufficiently kept away from the workpiece 16 and from the gap between the workpiece 16 and the screen 22 by the chip collector 24.

In order to strip off the chips 46, the mechanical stripper 42 is moved in the direction of the tool head 14 (illustrated with broken lines) such that the chips 46 are correspondingly displaced and then drop down into the machining area 12.

The arrangement according to FIG. 10, in which a very short collecting surface 28 and a very short chip collector are used, has a particularly space-saving axial construction and requires a correspondingly short unclamping length. In this case, the chips 46 work themselves very tightly into the space between the machine hood 20 and the tool 44, the tool holder 56 and the tool head 14, wherein this may potentially result in increased yet acceptable wear.

In the arrangement according to FIG. 10, the chip collector 24 is furthermore realized on a plate that is not separately identified and forms a wall of the fluid channel 34 on its side facing the machining area 12, as well as a wall of the nozzle 32 on the side of the workpiece. The other wall of the these subassemblies is formed by another plate that is not separately identified and also represents the screen 22. Both plates are to one another by means of screws and corresponding spacers (not numbered) such than they can be exchanged in a particularly space-saving and flexible fashion. The fluid supply is realized by means of another separate subassembly (not numbered) that is arranged radially outside of the two plates and to which the arrangement or the two plates is likewise connected by means of a screw connection that is not numbered, wherein this separate subassembly is in turn connected to the machine hood 20. This arrangement not only can be easily realised constructively, but also allows a modular use of the subassembly for supplying the fluid, as well as or the plates and, if applicable, supplementary adapter plates, such that an adaptation to different workpiece diameters or an exchange due to wear can be quickly carried out.

The utilization of plates for realizing the nozzle walls also makes it possible to provide a relatively inexpensive ring nozzle, particularly with suitable working angles relative to the workpiece.

A separate stripper is eliminated in the arrangement according to FIG. 10 because it is assumed that the chips 46 are acted upon by centrifugal forces due to the constant rotation of the tool head 14 and the tool holder 46 and, if applicable, additionally or alternatively acted upon by the fluid, wherein said centrifugal forces suffice for removing the chips from the chip collector 24 when the workpiece is removed and, if applicable, the machine hood 20 is slightly removed from the tool head 14. It goes without saying that such a removal of the chips 46 is also possible in other embodiments or process managements.

LIST OF REFERENCE SYMBOLS

10 Metal cutting machine
12 Machining area
14 head
16 Workpiece
18 Hood opening
20 Machine hood
22 Screen
24 Chip collector
26 Gap
28 Collecting surface
30 Seal
32 Nozzle
34 Fluid channel
36 Stripper
38 Stripping nozzle
40 Stripping fluid channel
42 Mechanical stripper
44 Tool
46 Chip
48 Bernoulli seal
50 Bernoulli nozzle
52 Clamping jaw
54 Machine housing
56 Tool holder
58 Rotational axis

The invention claimed is:

1. A metal cutting machine featuring a tool head that rotates in a machining area, a stationary workpiece, an externally accessible machine hood that encloses the machining area and features a hood opening for introducing the workpiece into the machining area, a screen for preventing fluid from escaping through the hood opening, and a chip collector that is arranged in the machining area behind the hood opening,
wherein the chip collector comprises a collecting surface that is conically tapered decreasing in diameter toward the tool head and/or that is directed radially outwards.

2. The metal cutting machine according to claim 1, wherein a gap between the screen and the workpiece amounts to less than 20 mm.

3. The metal cutting machine according to claim 2, wherein said gap between said screen and said workpiece amounts to less than 15 mm.

4. The metal cutting machine according to claim 1, wherein the collecting surface is arranged rotationally symmetrical relative to a rotational axis of the tool head.

5. The metal cutting machine according to claim 1, wherein the chip collector is hardened.

6. The metal cutting machine according to claim 1, wherein the chip collector is arranged on the screen and/or on the machine hood.

7. The metal cutting machine according to claim 1, wherein the screen comprises a mechanical seal.

8. A metal cutting machine comprising
a tool head that rotates in a machining area,
a stationary workpiece,
an externally accessible machine hood that encloses the machining area, the machine hood featuring a hood opening for introducing the workpiece into the machining area and featuring a front face disposed axially in front of the tool head,
a screen for preventing fluid from escaping through the hood opening, the screen being attached to the front face of the machine hood, and
a stationary nozzle for liquid or liquid-air-mixture, the stationary nozzle being directed at the workpiece and being arranged in the screen such that the stationary nozzle is axially in front of the tool head.

9. The metal cutting machine according to claim 8, wherein the stationary nozzle comprises a ring nozzle or comprises multiple nozzle outlets and/or wherein the stationary nozzle generates a closed fluid sheath around the workpiece.

10. The metal cutting machine according to claim 8, wherein the nozzle opens into a gap between the screen and the workpiece.

11. The metal cutting machine according to claim 8, wherein the nozzle is directed at the tool head.

12. The metal cutting machine according to claim 7, wherein the screen comprises an elastic seal.

13. A metal cutting machine featuring a tool head that rotates in a machining area, a stationary workpiece, an externally accessible machine hood that encloses the machining area and features a hood opening for introducing the workpiece into the machining area, a screen for preventing fluid from escaping through the hood opening, and a chip collector that is arranged in the machining area behind the hood opening, wherein the chip collector comprises a stripper.

14. The metal cutting machine according to claim 13, wherein said stripper comprises tongs, a gripper, a bow, or a ring able to strip over said chip collector.

15. The metal cutting machine according to claim 13, wherein said chip collector comprises a collecting surface that is conically tapered decreasing in diameter toward the tool head.

16. The metal cutting machine according to claim 15, wherein said stripper comprises tongs, a gripper, a bow, or a ring able to strip over said collecting surface.

17. The metal cutting machine according to claim 15, wherein the collecting surface is arranged rotationally symmetrical referred to a rotational axis of the tool head.

\* \* \* \* \*